United States Patent
Yang et al.

(10) Patent No.: US 9,940,501 B2
(45) Date of Patent: Apr. 10, 2018

(54) METHOD AND SYSTEM FOR PROCESSING FINGERPRINT SENSING SIGNALS AND FINGERPRINT IDENTIFICATION TERMINAL

(71) Applicant: SHENZHEN GOODIX TECHNOLOGY CO., LTD., Shenzhen, Guangdong (CN)

(72) Inventors: Meng-Ta Yang, Guangdong (CN); Ming-ju Sung, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/104,495

(22) PCT Filed: Oct. 9, 2014

(86) PCT No.: PCT/CN2014/088214
§ 371 (c)(1),
(2) Date: Jun. 14, 2016

(87) PCT Pub. No.: WO2016/023263
PCT Pub. Date: Feb. 18, 2016

(65) Prior Publication Data
US 2017/0147860 A1    May 25, 2017

(30) Foreign Application Priority Data

Aug. 15, 2014 (CN) .......................... 2014 1 0403230

(51) Int. Cl.
*G06K 9/00* (2006.01)
*G06K 9/40* (2006.01)

(52) U.S. Cl.
CPC ....... *G06K 9/00067* (2013.01); *G06K 9/0002* (2013.01); *G06K 9/40* (2013.01)

(58) Field of Classification Search
None
See application file for complete search history.

(56) References Cited

U.S. PATENT DOCUMENTS 4,016,490 A * 4/1977 Weckenmann ...... H03K 17/955
257/659
4,656,871 A * 4/1987 Czarnocki ................ G01D 5/24
330/282

(Continued)

FOREIGN PATENT DOCUMENTS

CN        101721821 A        6/2010
CN        103376970 A        10/2013

(Continued)

OTHER PUBLICATIONS

International Search Report (Chinese version), dated May 19, 2015 in PCT Application No. PCT/CN2014/088214.

(Continued)

*Primary Examiner* — Randolph I Chu
(74) *Attorney, Agent, or Firm* — Maschoff Brennan

(57) ABSTRACT

The present invention relates to the field of fingerprint identification technologies, and provides a method and a system for processing fingerprint sensing signals, and a fingerprint identification terminal. The method includes a frequency mixing step by mixing a collected high frequency fingerprint sensing signal with a first high frequency signal to obtain a low frequency signal; and an amplification step by amplifying the low frequency signal. By using the character that capacitance impedance is inversely proportional to signal frequency, the present invention shifts a fingerprint sensing signal with a high frequency into a signal with a low frequency through frequency spectrum shifting and performs signal amplification on the signal with a low frequency, which can overcome the difficulty in amplifying (Continued)

the high frequency fingerprint sensing signal and thus improves the signal-to-noise ratio SNR.

14 Claims, 3 Drawing Sheets

(56) References Cited

U.S. PATENT DOCUMENTS

| | | | |
|---|---|---|---|
| 4,743,837 A * | 5/1988 | Herzog | G01B 7/023 324/611 |
| 4,763,063 A * | 8/1988 | Shkedi | G01D 5/24 324/661 |
| 5,767,686 A * | 6/1998 | Kespohl | B65H 23/0204 324/661 |
| 5,778,089 A * | 7/1998 | Borza | G06K 9/0002 250/556 |
| 5,828,773 A * | 10/1998 | Setlak | G06K 9/0002 382/126 |
| 5,844,415 A * | 12/1998 | Gershenfeld | B60N 2/002 324/663 |
| 5,936,412 A * | 8/1999 | Gershenfeld | B60N 2/002 324/663 |
| 5,973,623 A * | 10/1999 | Gupta | H03K 17/962 307/116 |
| 6,011,859 A * | 1/2000 | Kalnitsky | G06K 9/00053 382/100 |
| 6,088,471 A * | 7/2000 | Setlak | G06K 9/00053 382/116 |
| 6,114,862 A * | 9/2000 | Tartagni | G01B 7/004 324/661 |
| 6,191,593 B1 * | 2/2001 | Tartagni | G01B 7/004 324/663 |
| 6,236,741 B1 * | 5/2001 | Kovacs-Vajna | A61B 5/1172 340/5.53 |
| 6,256,022 B1 * | 7/2001 | Manaresi | G06F 3/03547 178/18.06 |
| 6,512,381 B2 * | 1/2003 | Kramer | A61B 5/1172 324/658 |
| 8,432,170 B1 * | 4/2013 | Walsh | G06F 3/044 324/658 |
| 9,158,958 B2 * | 10/2015 | Wickboldt | G06K 9/00026 |
| 2004/0096061 A1 | 5/2004 | Shinozaki et al. | |
| 2007/0200545 A1 * | 8/2007 | Loi | G05F 3/262 323/315 |
| 2009/0123039 A1 | 5/2009 | Gozzini | |
| 2013/0063163 A1 * | 3/2013 | Sim | G01N 27/223 324/663 |
| 2013/0271422 A1 | 10/2013 | Hotelling et al. | |
| 2016/0141882 A1 * | 5/2016 | Ichikawa | H02J 17/00 307/104 |
| 2016/0215397 A1 * | 7/2016 | Rinzan | C23C 16/52 |
| 2017/0039410 A1 * | 2/2017 | Pi | G06F 1/1643 |
| 2017/0068838 A1 * | 3/2017 | Kravets | G06F 3/044 |

FOREIGN PATENT DOCUMENTS

JP     2005091139 A     4/2005
JP     2010019785 A     1/2010

OTHER PUBLICATIONS

Written Report of ISA (Chinese version), dated May 19, 2015 in PCT Application No. PCT/CN2014/088214.
International Search Report (English version), dated May 19, 2015 in PCT Application No. PCT/CN2014/088214.
CN Office Action dated Sep. 9, 2016 as received in Application No. 201410403230.2 (English Translation).
CN Office Action dated Feb. 4, 2017 as received in Application No. 201410403230.2 (English Translation).

* cited by examiner

METHOD AND SYSTEM FOR PROCESSING FINGERPRINT SENSING SIGNALS AND FINGERPRINT IDENTIFICATION TERMINAL

TECHNICAL FIELD

The present invention relates to the field of fingerprint identification technologies and, more particularly, to a method and a system for processing fingerprint sensing signals and a fingerprint identification terminal.

BACKGROUND

Fingerprint has almost become a pronoun for biometric features identification due to the lifelong invariance, uniqueness and accessibility. While a fingerprint identification technology has also been widely applied to various terminal devices, such as a mobile terminal, a banking system, an attendance system, or the like, and is frequently used for providing security access to sensitive electronic devices and/or data.

A capacitive fingerprint detection circuit is a front analog circuit that is operable to read fingerprint information. FIG. 1 shows a circuit structure of a known design, and its principle is to conduct a driving signal (for example, a driving signal with a frequency of 400 KHz) onto a touch plane; when a finger touches the plane, a touch operation can transmit a fingerprint sensing signal into a system through a capacitor on the plane.

Chinese invention patent application CN103376970 A discloses another capacitive fingerprint sensor, where the capacitive fingerprint sensor can be formed by an array of sensing elements. Each capacitive sensing element of the array records a voltage that changes with the capacity coupling capacitance, and the capacitive sensing element is located between the finger and a sensing chip, and the finger can be capacitively coupled to each capacitive sensing element of the sensor, so that the sensor can sense the capacitance between each capacitive sensing element and a fingerprint muscle. The sensing chip detects a capacitance signal through sensing the voltage changes on the capacitive sensing element. Also, the sensing chip can detect a capacitance signal by sensing the change of charges that are received by the capacitive sensing element.

There is a problem in the two fingerprint identification technologies described above and in other existing designs that because the capacitance C in the feedback loop of an amplifier is very small, it is very difficult to amply the fingerprint sensing signal and the SNR (signal-to-noise ratio) is low.

SUMMARY

An embodiment of the present invention is to solve a first technical problem by a method for processing fingerprint sensing signals, which aims at improving the signal-to-noise ratio SNR of the fingerprint sensing signal.

An embodiment of the present invention is defined as a method for processing fingerprint sensing signals. The method includes a frequency mixing step by performing frequency mixing of a collected high frequency fingerprint sensing signal with a first high frequency signal to obtain a low frequency signal; and an amplifying processing step by performing amplification on the low frequency signal.

Before the frequency mixing step, the method further includes a signal conversion step by converting the collected high frequency fingerprint sensing signal in a voltage form into a high frequency fingerprint sensing signal in a current form and performing the frequency mixing step based on the high frequency fingerprint sensing signal in a current form.

An embodiment of the present invention is to solve a second technical problem by a system for processing fingerprint sensing signals. The system includes a frequency mixer configured to perform frequency mixing of a collected high frequency fingerprint sensing signal with a first high frequency signal to obtain a low frequency signal; and a capacitive feedback amplifier configured to perform amplification on the low frequency signal, where an inverting input end of the capacitive feedback amplifier is connected to the output end of the frequency mixer, a feedback capacitor is connected between the inverting input end and an output end of the capacitive feedback amplifier, and an non-inverting input end of the capacitive feedback amplifier is connected to a bias voltage.

An embodiment of the present invention is to solve a third technical problem by a fingerprint identification terminal. The fingerprint identification terminal includes a plurality of fingerprint sensing pixels distributed in an array manner, where each fingerprint sensing pixel is connected to a system for processing fingerprint sensing signals. The system includes: a frequency mixer configured to conduct frequency mixing processing on a high frequency fingerprint sensing signal collected with a first high frequency signal to obtain a low frequency signal; and a capacitive feedback amplifier configured to conduct amplifying processing on the low frequency signal, wherein the inverting input end of the capacitive feedback amplifier is connected to the output end of the frequency mixer, a feedback capacitor is connected between the inverting input end and the output end of the capacitive feedback amplifier, and the non-inverting input end of the capacitive feedback amplifier is connected to a bias voltage.

The system may further include a voltage-current converter configured to convert the high frequency fingerprint sensing signal in a voltage form collected into a high frequency fingerprint sensing signal in a current form, and output the high frequency fingerprint sensing signal in a current form to the frequency mixer, so that the frequency mixer conducts frequency mixing processing based on the high frequency fingerprint sensing signal in a current form.

The voltage-current converter may include a first switch tube, where the first end of the first switch tube is connected to a power supply, and the control end of the first switch tube is connected to a bias voltage; a second switch tube, where the first end of the second switch tube is connected to the second end of the first switch tube, the second end of the second switch tube is served as an output end and is connected to one input end of the frequency mixer, and the control end of the second switch tube is configured to input the high frequency fingerprint sensing signal in a voltage form; and a third switch tube, where the first end of the third switch tube is connected to the second end of the first switch tube, the second end of the third switch tube is connected to the ground, and the control end of the third switch tube is configured to input a reference voltage.

The capacitive feedback amplifier may include a fourth switch tube, where the first end of the fourth switch tube is connected to a power supply, and the control end of the fourth switch tube is connected to a bias voltage; a fifth switch tube, where the first end of the fifth switch tube is connected to the second end of the fourth switch, and the control end of the fifth switch tube is served as a non-inverting input end of the capacitive feedback amplifier and is connected to a bias voltage; a sixth switch tube, where both the first end and the control end of the sixth switch tube are connected to the second end of the fifth switch tube, and the second end of the sixth switch tube is connected to the ground; a seventh switch tube, where the first end of the seventh switch tube is connected to the second end of the fourth switch tube, the control end of the seventh switch tube is served as the inverting input end of the capacitive feedback amplifier and is connected to the output end of the frequency mixer, and the second end of the seventh switch tube is served as the output end of the capacitive feedback amplifier and is connected to the control end of the seventh switch tube through a capacitor; and an eighth switch tube, where the first end of the eighth switch tube is connected to the second end of the seventh switch tube, the control end of the eighth switch tube is connected to a bias voltage, and the second end of the eighth switch tube is connected to the ground.

By utilizing the feature that the capacitance impedance is inversely proportional to the signal frequency, the present invention performs frequency mixing of a high frequency fingerprint sensing signal with a first high frequency signal by way of frequency spectrum shifting and performs signal amplification at a low frequency after the frequency spectrum shifting, which can thus overcome the difficulty in signal amplification of a high frequency fingerprint sensing signal and improve the signal-to-noise ratio SNR thereof.

DETAILED DESCRIPTION

In order to make the objects, technical solutions and advantages of the present invention more clear, the present invention will be further described in details hereinafter with reference to the drawings and embodiments. It should be understood that the specific embodiments described herein are only for explanation of the present invention only, but are not intended to limit the present invention.

Because the capacitance impedance is inversely proportional to the signal frequency: $Z=1/(j*2*3.14*f*C)$, wherein Z represents the impedance, f represents the signal frequency, C represents the capacitance value of the feedback capacitor, and j represents an imaginary unit. That is, the capacitance impedance at a low frequency is higher than the capacitance impedance at a high frequency. According to the formula above, the frequency f reduces from 400 KHz to 10 KHz, the capacitance value C is unchanged, the impedance Z is increased to 40 times of the original; that is, the embodiment of the present invention implements a gain that is dozens of times of that of the circuit in the past in the case that the same circuit element values are used, so as to improve the signal noise ratio SNR.

Figure 1:
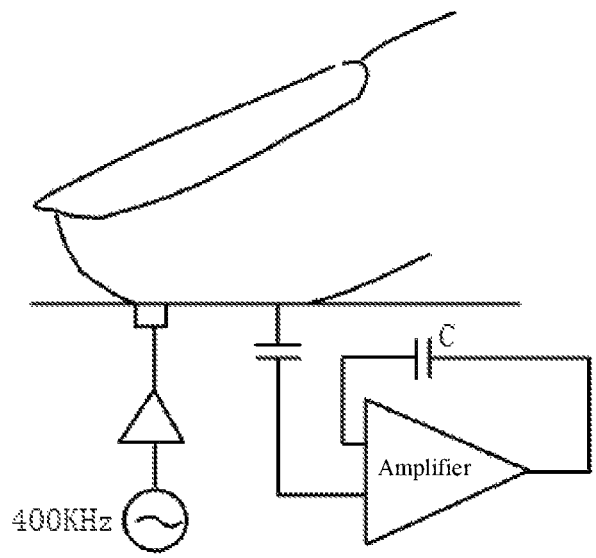
FIG. 1 is a circuit diagram of a capacitive fingerprint detection circuit provided by the prior art.
Figure 2:
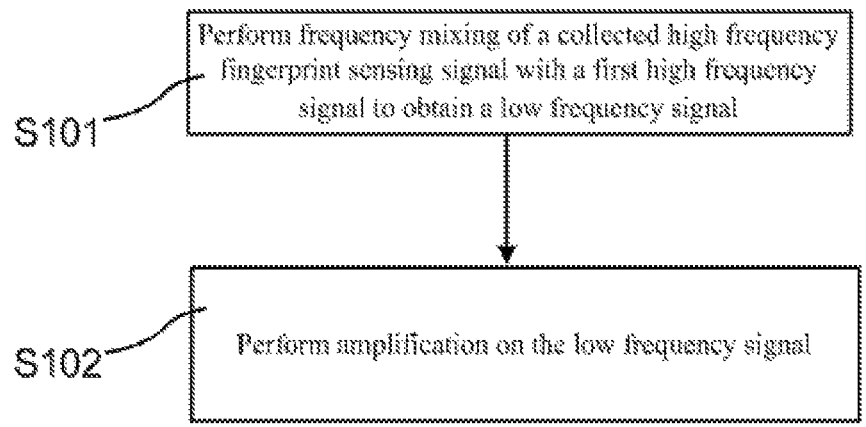
FIG. 2 is a flow chart of implementing a method for processing fingerprint sensing signals according to an embodiment of the present invention.

Based on the foregoing principle, the flow of the processing method for fingerprint sensing signals according to an embodiment of the present invention is as shown in FIG. 2, wherein the steps thereof are elaborated as follows.

Step S101 is a frequency mixing step: conducting frequency mixing processing on a collected high frequency fingerprint sensing signal with a first high frequency signal to obtain a low frequency signal.

Figure 3:
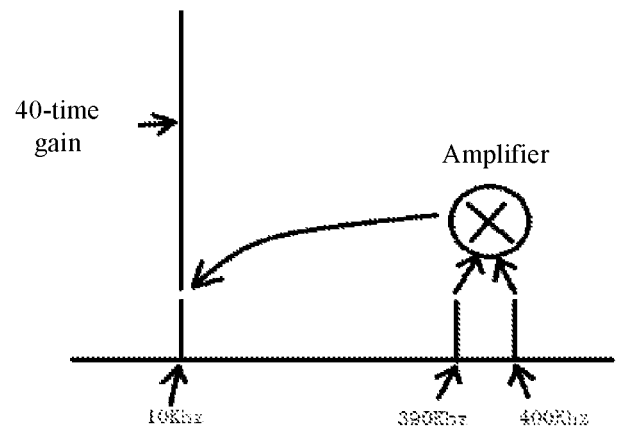
FIG. 3 is a block diagram of frequency spectrum shifting after frequency mixing processing on 400 KHz and 390 KHz according to an embodiment of the present invention.

A high frequency driving signal (for example, the signal frequency is 400 KHz) is conducted to a touch plane, when the signal is touched by fingers and conducted to a capacitor, a high frequency fingerprint sensing signal is obtained. The high frequency fingerprint sensing signal and a first high frequency signal (for example, the signal frequency is 390 KHz) are mixed to produce a low frequency signal (the signal frequency is 10 KHz), wherein the frequency spectrum shifting is as shown in FIG. 3, and it can be seen that a 40-times gain is produced.

Step S102 is an amplifying step: conducting amplifying processing on the low frequency signal.

To facilitate subsequent integral processing on the high frequency fingerprint sensing signal, the high frequency fingerprint sensing signal needs to be converted from a voltage form to a current form before amplifying, and then the high frequency fingerprint sensing signal in a current form obtained after the converting is mixed.

Figure 4:
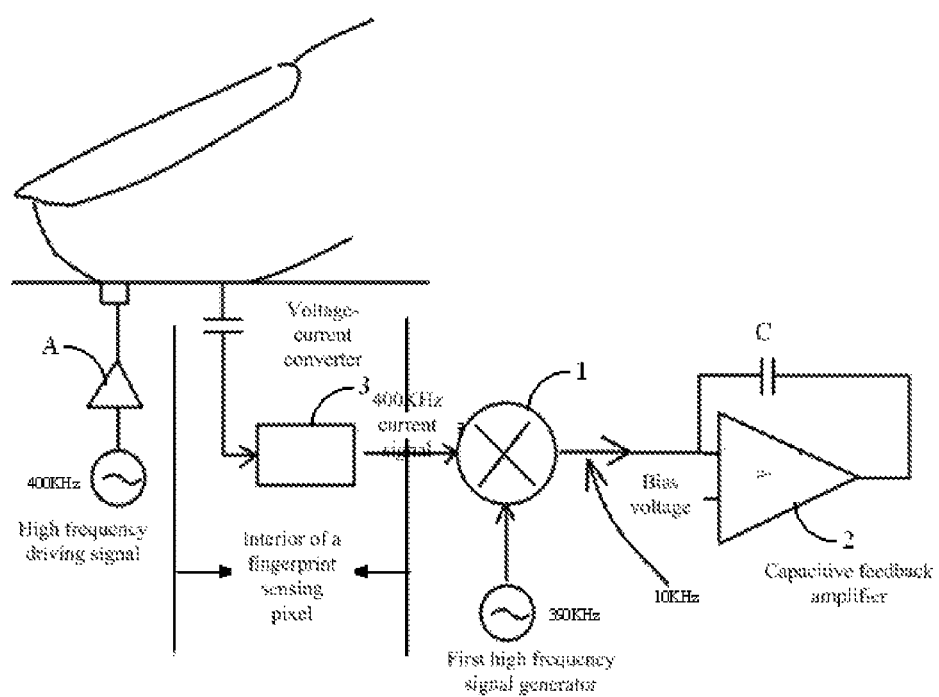
FIG. 4 is a logic structure chart of a fingerprint identification terminal according to an embodiment of the present invention.

FIG. 4 shows a logic structure of a fingerprint identification terminal provided by the embodiment of the present invention. To facilitate description, parts related to the embodiment of the present invention are illustrated only.

Referring to FIG. 4, the fingerprint identification terminal includes a plurality of fingerprint sensing pixels distributed in an array manner, wherein each fingerprint sensing pixel is connected to a processing system for fingerprint sensing signals, wherein A represents an output buffer amplifier. The processing system includes a frequency mixer 1 and a capacitive feedback amplifier 2, wherein the frequency mixer 1 is configured to conduct frequency mixing processing on the collected high frequency fingerprint sensing signal with a first high frequency signal (produced by a first high frequency signal generator) to obtain a low frequency signal; then the capacitive feedback amplifier 2 conducts amplifying processing on the low frequency signal, wherein the inverting input end of the capacitive feedback amplifier 2 is connected to the output end of the frequency mixer 1; moreover, a feedback capacitor C is also connected between the inverting input end and the output end of the capacitive feedback amplifier, while the non-inverting input end of the capacitive feedback amplifier is connected to a bias voltage BIAS.

To facilitate subsequent integral similarly, the processing system further includes a voltage-current converter 3, wherein the voltage-current converter 3 is configured to convert the high frequency fingerprint sensing signal in a voltage form collected into a high frequency fingerprint sensing signal in a current form, and outputs the high frequency fingerprint sensing signal in a current form to the frequency mixer 1, so that the frequency mixer 1 conducts frequency mixing processing based on the high frequency fingerprint sensing signal in a current form.

Figure 5:
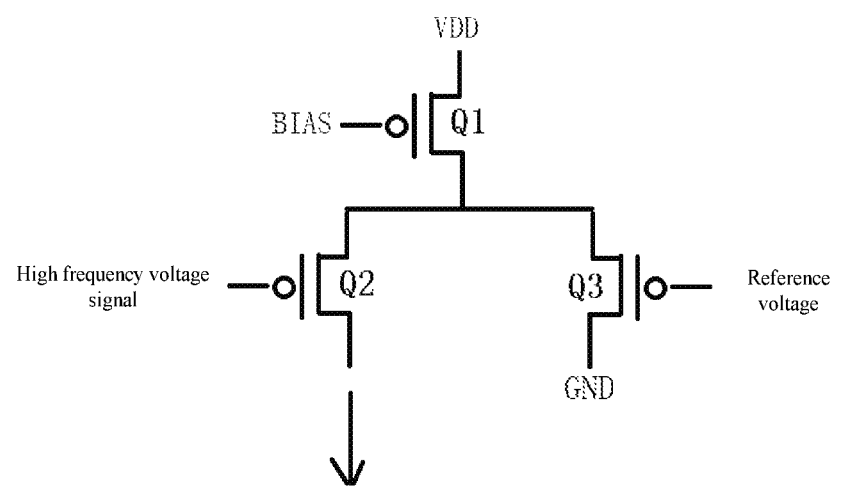
FIG. 5 is an example circuit diagram of a voltage-current converter in FIG. 4.

FIG. 5 shows a specific structure of the voltage-current converter 3, which includes a first switch tube Q1, a second switch tube Q2, and a third switch tube Q3, wherein the first end of Q1 is connected to a power supply VDD, and the control end of Q1 is connected to a bias voltage BIAS; the first end of Q2 is connected to the second end of Q1, the second end of Q2 is served as an output end and is connected to one input end of the frequency mixer 1, and the control terminal of Q2 is configured to input the high frequency fingerprint sensing signal in a voltage form; the first end of Q3 is connected to the second end of Q1, the second end of Q3 is connected to the ground, and the control end of Q3 is configured to input a reference voltage. All the first switch tube Q1, the second switch tube Q2 and the third switch tube Q3 above can be implemented using a PMOS tube.

FIG. 5 shows a circuit which is a differential pair, wherein the working principle thereof is as follows: the first end of Q1 is connected to a power supply VDD; when the voltage of BIAS and VDD satisfy a certain condition (for example, BIAS is less than VDD), Q1 is switched on to provide a constant current for Q2 and Q3, Q2 is switched on through a high frequency voltage signal (i.e., the high frequency fingerprint sensing signal), and Q3 is switched on through a reference voltage. If the reference voltage keeps unchanged, the high frequency voltage signal is increased (i.e., the high frequency voltage signal is greater than the reference voltage), then the current of the second end of Q2 is decreased according to the features of the PMOS tube; when the high frequency voltage signal is decreased (i.e., the high frequency voltage is less than the reference voltage), then the current of the second end of Q2 is increased, and the current of the second end of Q2 changes inversely with the change of the high frequency voltage signal.

Figure 6:
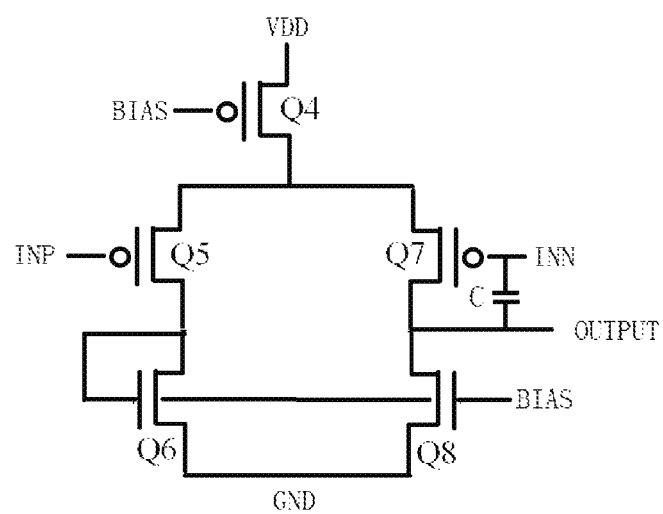
FIG. 6 is an example circuit diagram of a capacitive feedback amplifier in FIG. 4.

Moreover, FIG. 6 shows a specific structure of the capacitive feedback amplifier 2, which includes a fourth switch tube Q4, a fifth switch tube Q5, a sixth switch tube Q6, a seventh switch tube Q7, and an eighth switch tube Q8, wherein the first end of Q4 is connected to a power supply VDD, and the control end of Q4 is connected to a bias voltage BIAS; the first end of Q5 is connected to the second end of the fourth switch, and the control end INP of Q5 is served as a non-inverting input end of the capacitive feedback amplifier 2 and is connected to a bias voltage BIAS; both the first end and the control end of Q6 are connected to the second end of Q5, and the second end of Q6 is connected to the ground GND; the first end of Q7 is connected with the second end of the fourth switch tube, the control end INN of Q7 is served as the inverting input end of the capacitive feedback amplifier 2 and is connected to the output end of the frequency mixer 1, the second end of Q7 is served as the output end OUTPUT of the capacitive feedback amplifier 2 and is connected to the control end INN of Q7 through a capacitor; the first end of Q8 is connected to the second end of the seventh switch tube, the control end of Q8 is connected to a bias voltage BIAS, and the second end of Q8 is connected to the ground GND. The fourth switch tube Q4, the fifth switch tube Q5 and the seventh switch tube Q7 above can be implemented using a PMOS tube, while the sixth switch tube Q6 and the eighth switch tube Q8 can be implemented using an NM0S tube.

FIG. 6 shows a circuit which is an operational amplifier, wherein the working principle thereof is as follows: the effect of Q4 is same as that of Q1 in FIG. 5; if INP keeps unchanged, and INN is increased (i.e., INN is greater than INP), then the current of Q7 is decreased according to the features of the PMOS tube, then the drain voltage of Q7 (i.e., OUTPUT) will be greatly reduced. Because signals between INN and OUTPUT are inverting and the gain there between is very high, virtual ground is formed at the INN end, and a feedback capacitor is connected between INN and OUTPUT, then the current flowing in INN will be completely integrated into the capacitor, so as to achieve the effect of amplifying and integrating the low frequency signal.

The foregoing is merely preferred embodiments of the invention, but is not intended to limit the invention; and any modification, equivalent replacement, improvement and the like made within the spirits and principles of the invention shall all fall within the protection scope of the invention.

INDUSTRIAL APPLICABILITY

In conclusion, the present invention utilizes the character that capacitance impedance is inversely proportional to signal frequency, mixes the high frequency fingerprint sensing signal with the first high frequency signal through frequency spectrum shifting, and then amplifies the signal after shifting the signal to a low frequency, so as to implement a gain that is dozens of times of that of the circuit in the past in the case that the same circuit element values are used, so as to improve the signal noise ratio SNR of the fingerprint sensing signal. On the other hand, before the fingerprint sensing signal enters the amplifier, the fingerprint sensing signal is converted from a voltage form to a current form, which facilitates integrating.

What is claimed is:

1. A method for processing fingerprint sensing signals by a circuit, wherein the circuit comprises a frequency mixer and a capacitive feedback amplifier, the method comprising:
   mixing, by the frequency mixer, a collected high frequency fingerprint sensing signal with a first high frequency signal to obtain a low frequency signal; and
   amplifying, by the capacitive feedback amplifier, the low frequency signal, wherein the capacitive feedback amplifier includes an inverting input end connected to an output end of the frequency mixer, a non-inverting input end connected to a bias voltage, and an output end, wherein a feedback capacitor is connected between the inverting input end and the output end of the capacitive feedback amplifier.

2. The method according to claim 1, wherein the circuit further comprises a voltage-current converter, and before the frequency mixing step the method further comprises:
   converting, by the voltage-current converter, a collected high frequency fingerprint sensing signal in a voltage form into a high frequency fingerprint sensing signal in a current form; and
   performing the frequency mixing step based on the high frequency fingerprint sensing signal in the current form.

3. A system for processing fingerprint sensing signals, the system comprising:
   a frequency mixer configured to mix a collected high frequency fingerprint sensing signal with a first high frequency signal to obtain a low frequency signal; and
   a capacitive feedback amplifier configured to perform amplification of the low frequency signal, wherein an inverting input end of the capacitive feedback amplifier is connected to an output end of the frequency mixer, a feedback capacitor is connected between the inverting input end and an output end of the capacitive feedback amplifier, and a non-inverting input end of the capacitive feedback amplifier is connected to a bias voltage.

4. The system according to claim 3, wherein the system further comprises:
   a voltage-current converter configured to convert a collected high frequency fingerprint sensing signal in a voltage form into a high frequency fingerprint sensing signal in a current form and output the high frequency fingerprint sensing signal in a current form to the frequency mixer, so that the frequency mixer performs frequency mixing based on the high frequency fingerprint sensing signal in a current form.

5. The processing system according to claim 4, wherein the voltage-current converter comprises:
   a first switch tube, wherein a first end of the first switch tube is connected to a power supply, and a control end of the first switch tube is connected to a bias voltage;
   a second switch tube, wherein a first end of the second switch tube is connected to a second end of the first switch tube, a second end of the second switch tube is served as an output end and is connected to an input end of the frequency mixer, and a control end of the second switch tube is configured to input the high frequency fingerprint sensing signal in a voltage form; and
   a third switch tube, wherein a first end of the third switch tube is connected to the second end of the first switch tube, a second end of the third switch tube is connected to the ground, and a control end of the third switch tube is configured to input a reference voltage.

6. The processing system according to claim 3, wherein the capacitive feedback amplifier comprises:
   a fourth switch tube, wherein a first end of the fourth switch tube is connected to a power supply, and a control end of the fourth switch tube is connected to a bias voltage;
   a fifth switch tube, wherein a first end of the fifth switch tube is connected to a second end of the fourth switch, and a control end of the fifth switch tube is served as the non-inverting input end of the capacitive feedback amplifier and is connected to a bias voltage;
   a sixth switch tube, wherein both a first end and a control end of the sixth switch tube are connected to a second end of the fifth switch tube, and a second end of the sixth switch tube is connected to the ground;
   a seventh switch tube, wherein a first end of the seventh switch tube is connected to the second end of the fourth switch tube, a control end of the seventh switch tube is served as the inverting input end of the capacitive feedback amplifier and is connected to the output end of the frequency mixer, and a second end of the seventh switch tube is served as the output end of the capacitive feedback amplifier and is connected to a control end of the seventh switch tube through a capacitor; and
   an eighth switch tube, wherein a first end of the eighth switch tube is connected to the second end of the seventh switch tube, a control end of the eighth switch tube is connected to a bias voltage, and a second end of the eighth switch tube is connected to the ground.

7. A fingerprint identification terminal, comprising a plurality of fingerprint sensing pixels distributed in an array manner, wherein each fingerprint sensing pixel is connected to a processing system for fingerprint sensing signals, and the processing system comprises:
   a frequency mixer configured to mix a collected high frequency fingerprint sensing signal with a first high frequency signal to obtain a low frequency signal; and
   a capacitive feedback amplifier configured to perform amplification of the low frequency signal, wherein an inverting input end of the capacitive feedback amplifier is connected to an output end of the frequency mixer, a feedback capacitor is connected between the inverting input end and the output end of the capacitive feedback amplifier, and a non-inverting input end of the capacitive feedback amplifier is connected to a bias voltage.

8. The fingerprint identification terminal according to claim 7, wherein the processing system further comprises:
   a voltage-current converter configured to convert the collected high frequency fingerprint sensing signal in a voltage form into a high frequency fingerprint sensing signal in a current form, and output the high frequency fingerprint sensing signal in a current form to the frequency mixer, so that the frequency mixer perform frequency mixing processing based on the high frequency fingerprint sensing signal in a current form.

9. The fingerprint identification terminal according to claim 8, wherein the voltage-current converter comprises
   a first switch tube, wherein a first end of the first switch tube is connected to a power supply, and a control end of the first switch tube is connected to a bias voltage;
   a second switch tube, wherein a first end of the second switch tube is connected to a second end of the first switch tube, the second end of the second switch tube is served as an output end and is connected to an input end of the frequency mixer, and a control end of the second switch tube is configured to input the high frequency fingerprint sensing signal in a voltage form; and
   a third switch tube, wherein a first end of the third switch tube is connected to the second end of the first switch tube, a second end of the third switch tube is connected to the ground, and a control end of the third switch tube is configured to input a reference voltage.

10. The fingerprint identification terminal according to claim 7, wherein the capacitive feedback amplifier comprises:
    a fourth switch tube, wherein a first end of the fourth switch tube is connected to a power supply, and a control end of the fourth switch tube is connected to a bias voltage;
    a fifth switch tube, wherein a first end of the fifth switch tube is connected to a second end of the fourth switch, and a control end of the fifth switch tube is served as a non-inverting input end of the capacitive feedback amplifier and is connected to a bias voltage;
    a sixth switch tube, wherein both a first end and a control end of the sixth switch tube are connected to a second end of the fifth switch tube, and the second end of the sixth switch tube is connected to the ground;
    a seventh switch tube, wherein a first end of the seventh switch tube is connected to the second end of the fourth switch tube, a control end of the seventh switch tube is served as the inverting input end of the capacitive feedback amplifier and is connected to the output end of the frequency mixer, and a second end of the seventh switch tube is served as the output end of the capacitive feedback amplifier and is connected to a control end of the seventh switch tube through a capacitor; and
    an eighth switch tube, wherein a first end of the eighth switch tube is connected to the second end of the seventh switch tube, a control end of the eighth switch tube is connected to a bias voltage, and a second end of the eighth switch tube is connected to the ground.

11. The fingerprint identification terminal according to claim 4, wherein the capacitive feedback amplifier comprises:
    a fourth switch tube, wherein a first end of the fourth switch tube is connected to a power supply, and a control end of the fourth switch tube is connected to a bias voltage;
    a fifth switch tube, wherein a first end of the fifth switch tube is connected to a second end of the fourth switch, and a control end of the fifth switch tube is served as a non-inverting input end of the capacitive feedback amplifier and is connected to a bias voltage;

a sixth switch tube, wherein both a first end and a control end of the sixth switch tube are connected to a second end of the fifth switch tube, and the second end of the sixth switch tube is connected to the ground;

a seventh switch tube, wherein a first end of the seventh switch tube is connected to the second end of the fourth switch tube, a control end of the seventh switch tube is served as the inverting input end of the capacitive feedback amplifier and is connected to the output end of the frequency mixer, and a second end of the seventh switch tube is served as the output end of the capacitive feedback amplifier and is connected to a control end of the seventh switch tube through a capacitor; and an eighth switch tube, wherein a first end of the eighth switch tube is connected to the second end of the seventh switch tube, a control end of the eighth switch tube is connected to a bias voltage, and a second end of the eighth switch tube is connected to the ground.

12. The fingerprint identification terminal according to claim 5, wherein the capacitive feedback amplifier comprises:

a fourth switch tube, wherein a first end of the fourth switch tube is connected to a power supply, and a control end of the fourth switch tube is connected to a bias voltage;

a fifth switch tube, wherein a first end of the fifth switch tube is connected to a second end of the fourth switch, and a control end of the fifth switch tube is served as a non-inverting input end of the capacitive feedback amplifier and is connected to a bias voltage;

a sixth switch tube, wherein both a first end and a control end of the sixth switch tube are connected to a second end of the fifth switch tube, and the second end of the sixth switch tube is connected to the ground;

a seventh switch tube, wherein a first end of the seventh switch tube is connected to the second end of the fourth switch tube, a control end of the seventh switch tube is served as the inverting input end of the capacitive feedback amplifier and is connected to the output end of the frequency mixer, and a second end of the seventh switch tube is served as the output end of the capacitive feedback amplifier and is connected to a control end of the seventh switch tube through a capacitor; and an eighth switch tube, wherein a first end of the eighth switch tube is connected to the second end of the seventh switch tube, a control end of the eighth switch tube is connected to a bias voltage, and a second end of the eighth switch tube is connected to the ground.

13. The fingerprint identification terminal according to claim 10, wherein the capacitive feedback amplifier comprises:

a fourth switch tube, wherein a first end of the fourth switch tube is connected to a power supply, and a control end of the fourth switch tube is connected to a bias voltage;

a fifth switch tube, wherein a first end of the fifth switch tube is connected to a second end of the fourth switch, and a control end of the fifth switch tube is served as a non-inverting input end of the capacitive feedback amplifier and is connected to a bias voltage;

a sixth switch tube, wherein both a first end and a control end of the sixth switch tube are connected to a second end of the fifth switch tube, and the second end of the sixth switch tube is connected to the ground;

a seventh switch tube, wherein a first end of the seventh switch tube is connected to the second end of the fourth switch tube, a control end of the seventh switch tube is served as the inverting input end of the capacitive feedback amplifier and is connected to the output end of the frequency mixer, and a second end of the seventh switch tube is served as the output end of the capacitive feedback amplifier and is connected to a control end of the seventh switch tube through a capacitor; and an eighth switch tube, wherein a first end of the eighth switch tube is connected to the second end of the seventh switch tube, a control end of the eighth switch tube is connected to a bias voltage, and a second end of the eighth switch tube is connected to the ground.

14. The fingerprint identification terminal according to claim 11, wherein the capacitive feedback amplifier comprises:

a fourth switch tube, wherein a first end of the fourth switch tube is connected to a power supply, and a control end of the fourth switch tube is connected to a bias voltage;

a fifth switch tube, wherein a first end of the fifth switch tube is connected to a second end of the fourth switch, and a control end of the fifth switch tube is served as a non-inverting input end of the capacitive feedback amplifier and is connected to a bias voltage;

a sixth switch tube, wherein both a first end and a control end of the sixth switch tube are connected to a second end of the fifth switch tube, and the second end of the sixth switch tube is connected to the ground;

a seventh switch tube, wherein a first end of the seventh switch tube is connected to the second end of the fourth switch tube, a control end of the seventh switch tube is served as the inverting input end of the capacitive feedback amplifier and is connected to the output end of the frequency mixer, and a second end of the seventh switch tube is served as the output end of the capacitive feedback amplifier and is connected to a control end of the seventh switch tube through a capacitor; and an eighth switch tube, wherein a first end of the eighth switch tube is connected to the second end of the seventh switch tube, a control end of the eighth switch tube is connected to a bias voltage, and a second end of the eighth switch tube is connected to the ground.

\* \* \* \* \*